United States Patent
Righi et al.

(10) Patent No.: US 7,234,039 B1
(45) Date of Patent: Jun. 19, 2007

(54) METHOD, SYSTEM, AND APPARATUS FOR DETERMINING THE PHYSICAL MEMORY ADDRESS OF AN ALLOCATED AND LOCKED MEMORY BUFFER

(75) Inventors: Stefano Righi, Lawrenceville, GA (US); Jerry Lynn Petree, Jr., Alpharetta, GA (US); Andrew Clifford McCallum, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 418 days.

(21) Appl. No.: 10/988,959

(22) Filed: Nov. 15, 2004

(51) Int. Cl.
   *G06F 12/08* (2006.01)
(52) U.S. Cl. .................... 711/203; 711/220; 711/170
(58) Field of Classification Search ............... 711/203, 711/170, 209, 108
   See application file for complete search history.

(56) References Cited

U.S. PATENT DOCUMENTS 6,928,529 B2 * 8/2005 Shinomiya .................. 711/203
2002/0172199 A1 * 11/2002 Scott et al. .................. 370/389
2003/0033431 A1 * 2/2003 Shinomiya .................. 709/245

\* cited by examiner

*Primary Examiner*—Gary Portka
*Assistant Examiner*—Hamdy Amed
(74) *Attorney, Agent, or Firm*—Hope Baldauff Hartman, LLC

(57) ABSTRACT

Methods and systems are provided for determining the physical address of an allocated and locked memory buffer. An application program may request the allocation of a memory buffer. A virtual memory address for the memory buffer is then returned. The virtual memory address is adjusted to correspond to a page boundary within a physical memory address space. The memory buffer is then locked to the physical memory. A predetermined bit pattern is then written to the memory buffer. A search may then be made of the physical memory for the bit pattern to determine the location within the physical memory address space of the allocated memory buffer. Once the physical address of the memory buffer has been determined, it may be utilized to reference the memory buffer by a program that would not otherwise have access to the virtual address space.

20 Claims, 4 Drawing Sheets

METHOD, SYSTEM, AND APPARATUS FOR DETERMINING THE PHYSICAL MEMORY ADDRESS OF AN ALLOCATED AND LOCKED MEMORY BUFFER

BACKGROUND OF THE INVENTION

Many desktop and server computer systems utilize a basic input/output system ("BIOS") to control various aspects of the computer system. In particular, the BIOS is utilized to perform a power on self-test, to initialize the various hardware components within the computer system, to provide an interface between an operating system executing on the computer system and the hardware, and to perform various other functions.

In many computer systems, the BIOS is stored in an electrically erasable and programmable read only memory ("EEPROM") device, also referred to herein as a "flash memory device" or a "flash part." Because flash memory devices may be programmed while actually installed in a computer system, a computer BIOS stored in such a device may be upgraded without removing the flash part from the computer system. This is very convenient for both end users and system administrators.

In order to upgrade or restore the contents of the BIOS EEPROM, a BIOS update utility application may be executed on the computer system. The BIOS update utility utilizes the contents of a BIOS image file, usually stored on disk or available through a network, to update the contents of the BIOS EEPROM. In order to perform this function, the BIOS update utility works in conjunction with a BIOS recovery program stored in the BIOS. The BIOS recovery program contains program code for performing the actual update of the BIOS EEPROM. Because the recovery program is a BIOS program and must be operating system independent, after the system has booted the Operation System, it executes in System Management Mode ("SMM") when executing on computer systems utilizing some processors available from INTEL CORPORATION or AMD or similar. The BIOS update utility and the recovery program work together to update the contents of the BIOS.

In order for the BIOS update utility and the recovery program to communicate with one another, it is typically necessary to create a device driver. A device driver is needed because the BIOS recovery program executes in the SMM mode and therefore cannot access the virtual memory addresses utilized by most modern computer operating systems and the BIOS update utility application. However, the creation and use of such device drivers can be time consuming and problematic. For instance, a device driver must be created for each of the operating systems on which the BIOS update utility is to be executed. Moreover, when utilized in conjunction with the LINUX operating system or the FREE BSD operating system developed by the University of California, Berkeley, the device driver must be recompiled for each distribution and version of the operating system. This may include the tedious and time consuming process of maintaining many different versions of the device driver for each distribution and version of the operating system.

One method for enabling communication between an application program and a BIOS program executing in SMM mode without the use of a device driver is through the use of a shared memory buffer locked into physical memory. For instance, in order to update the contents of the BIOS, the update utility may copy blocks of the BIOS image file into the shared memory buffer. The BIOS recovery program may then access the memory buffer, read its contents, and write the contents of the memory buffer to the EEPROM. This process may then be repeated until each block has been copied. However, because the BIOS update utility is an application program, it must utilize virtual memory addresses to reference an allocated memory buffer. Because the BIOS recovery program executes in SMM mode, it must utilize physical memory addresses to reference the memory buffer. The BIOS update utility must therefore determine the physical memory address of the buffer and pass this address to the BIOS recovery program. However, until now it has been impossible for a management application program, such as a BIOS update utility, to determine the physical memory address of an allocated memory buffer.

It is with respect to these considerations and others that the present invention has been made.

SUMMARY OF THE INVENTION

In accordance with the present invention, the above and other problems are solved by methods and systems for determining the physical memory address of an allocated and locked memory buffer in a computing system. In particular, a BIOS update utility application program can determine the physical memory address of an allocated and locked memory buffer and pass the physical memory address to a BIOS recovery program. The allocated and locked memory buffer can then be addressed by the BIOS recovery program using the physical memory address. By utilizing the allocated and locked memory buffer in this manner, the need for a device driver to enable the transfer of data between the BIOS update utility and the BIOS recovery program is eliminated.

According to one aspect of the invention, a method is provided for use within a computer system that includes a memory and executes an operating system supporting a physical memory address space and a virtual memory address space. According to the method, an application program executing on the operating system, such as a BIOS update utility, may request the allocation of a memory buffer from the operating system. In response to the request, the operating system may allocate the requested memory buffer. In particular, the operating system may return a pointer to the allocated memory buffer to the application program. The pointer to the allocated memory buffer will be expressed as a memory address within the virtual memory address space of the computer system. The size of the requested buffer must be less than or equal to the size of a page of physical memory within the computer system in order to guarantee contiguous memory. Moreover, to ensure that the memory buffer fits within a single page of physical memory, the amount of memory requested may be equal to the desired amount plus an amount equal to one page of physical memory.

Once the memory address for the allocated memory buffer in the virtual address space has been received, the application program determines whether the start of the memory buffer corresponds to a page boundary within the physical address space of the computer system. If the memory address of the memory buffer within the virtual address space does not correspond to a physical page boundary, the memory address is adjusted to correspond to a page boundary within the physical address space and also within the allocated memory buffer. The memory buffer must then be locked to a particular location within the physical memory address space.

Once the virtual memory address for the allocated memory buffer has been adjusted to point to a page boundary within the physical memory address space, a predetermined bit pattern is written to the allocated memory buffer. In particular, according to one embodiment, the bit pattern is written to the adjusted address of the allocated and locked memory buffer so that the bit pattern will exist at a page boundary within the physical memory space. The bit pattern may comprise a predefined portion and a random portion. The predefined portion may include one or more bits having a predefined value. The random portion may include one or more bits having a random value. The predefined portion and the random portion may be written to the allocated memory buffer in adjacent memory locations.

After the bit pattern has been written to memory, the application may perform a search of the physical memory to locate the written bit pattern. In particular, a search may be made at each of the page boundaries in the physical memory space to locate the written bit pattern. By locating the bit pattern in the physical memory space, the address within the physical memory of the allocated memory buffer can be determined. Once the physical address of the allocated memory buffer has been determined, the address can be utilized. In particular, the physical address may be passed to a BIOS program executing in an SMM mode. The physical address can then be utilized by the BIOS program to reference the allocated memory buffer. The address within the virtual address space may be utilized by the application program to reference the memory buffer. In this way, the allocated memory buffer may be utilized to transfer data between the BIOS program and the application program without the use of a device driver.

According to various aspects of the invention, a computer readable media comprising computer executable instructions for performing the various methods provided herein are also provided. Additionally, a computer controlled apparatus capable of performing the various methods described herein are also provided.

These and various other features as well as advantages, which characterize the present invention, will be apparent from a reading of the following detailed description and a review of the associated drawings.

DETAILED DESCRIPTION OF THE INVENTION

As described briefly above, embodiments of the present invention provide methods and systems for determining and utilizing the physical memory address of an allocated memory buffer. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Figure 1:
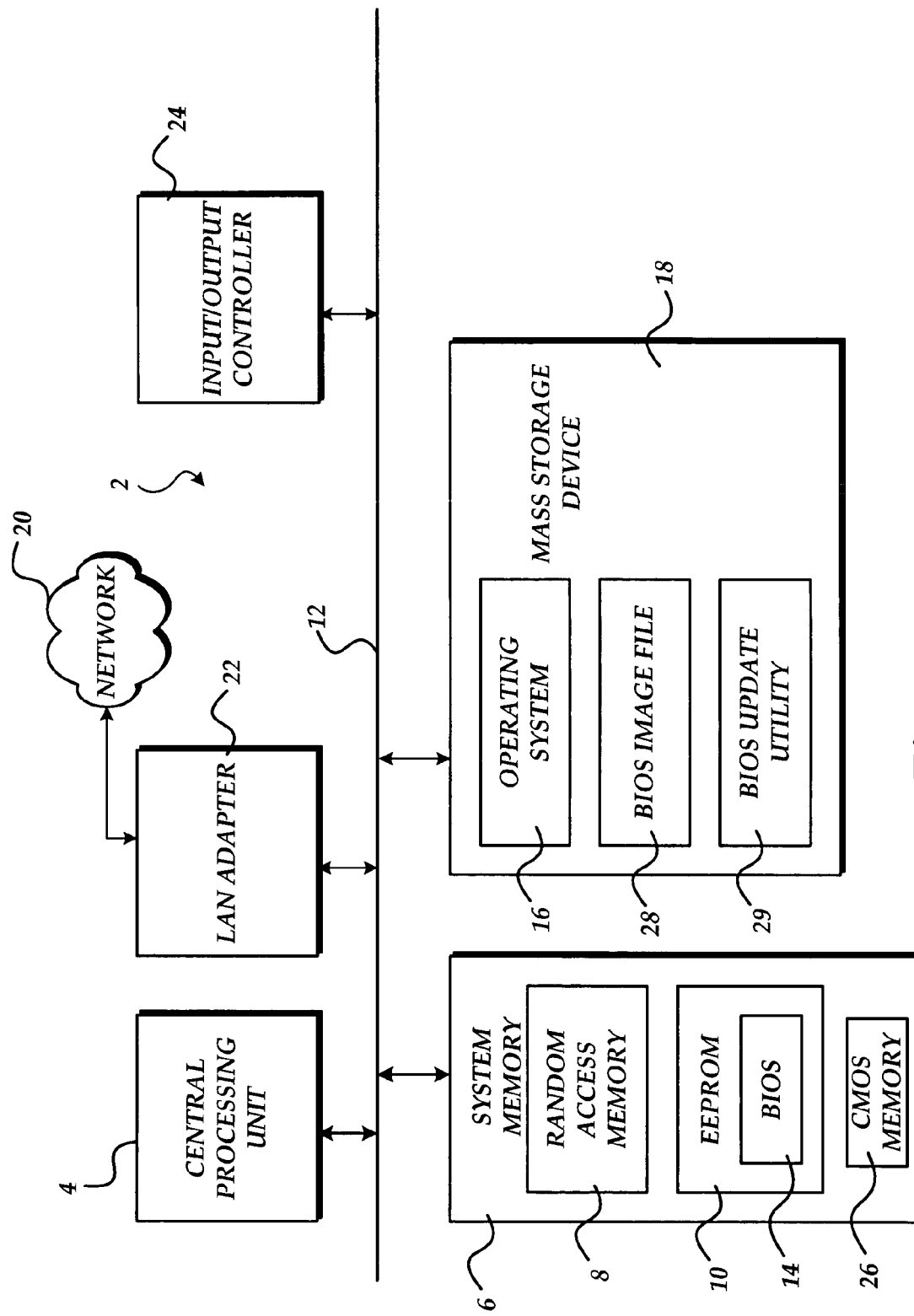
FIG. 1 is a block diagram illustrating a computer hardware and software architecture utilized in the various embodiments of the invention.

Referring now to the drawings, in which like numerals represent like elements throughout the several figures, aspects of the present invention and the illustrative operating environment will be described. FIG. 1 and the following discussion are intended to provide a brief, general description of a suitable computing environment in which the invention may be implemented. While the invention will be described in the general context of utilizing a BIOS update utility and a BIOS recovery program to update a computer BIOS, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules or data files may be located in both local and remote memory storage devices.

Turning now to FIG. 1, an illustrative computer architecture for a computing system 2 utilized in the various embodiments of the invention will be described. The computer architecture shown in FIG. 1 illustrates a conventional desktop or server computer, including a CPU 4, a system memory 6, including a RAM 8, an EEPROM 10 and a CMOS memory 26, and a system bus 12 that couples the memory to the CPU 4. A BIOS 14 containing the basic routines that help to transfer information between elements within the computer, such as during startup, is stored in the EEPROM 10. The BIOS 14 is executed by the CPU 4 when the computer 2 is powered on. The BIOS 14 performs a number of functions at startup of the computer 2, including discovering and initializing the RAM 8, copying the contents of the BIOS 14 to the RAM 8, executing the BIOS 14 to perform a power on self-test ("POST") routine, and to pass control of the computer 2 to an operating system 16. Once the operating system 16 has been loaded, aspects of the BIOS 14 may be utilized to manage data flow between the operating system 16 and devices attached to the computer 2, such as a mass storage device 18, a video adapter, a keyboard, a mouse and a printer. The CMOS memory 26 is a battery-backed memory device that is used by the BIOS 14 to store setting information for the computer 2.

As known to those skilled in the art, the BIOS 14 is an integral part of the computer 2 and is typically shipped with the computer 2 from the manufacturer. The BIOS 14 is made accessible to the CPU on an EEPROM device 10. When the computer 2 is powered on, the CPU 4 passes control to the BIOS 14, which is always located at the same place in the memory architecture of the computer 2. By utilizing the BIOS 14, the operating system 16 and its applications are freed from having to understand exact details, such as hardware addresses, about input/output devices attached to the computer 2. As described in greater detail herein, the BIOS 14 includes program code for updating itself from a BIOS image file 28 stored on a mass storage device 18.

The computing system 2 further includes a mass storage device 18 for storing an operating system 16, application programs, and other program modules. The mass storage device 18 is connected to the CPU 4 through a mass storage controller (not shown) connected to the bus 12. The mass storage device 18 and its associated computer-readable media, provide non-volatile storage for the computing system 2. Although the description of computer-readable media contained herein refers to a mass storage device, such as a hard disk or CD-ROM drive, it should be appreciated by those skilled in the art that computer-readable media can be any available media that can be accessed by the computing system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 2.

According to various embodiments of the invention, the computing system 2 may operate in a networked environment using logical connections to remote computers through a network 20, such as the Internet. The computing system 2 may connect to the network 20 through a network interface unit 22 connected to the bus 12. It should be appreciated that the network interface unit 22 may also be utilized to connect to other types of networks and remote computer systems. The computing system 2 may also include an input/output controller 24 for receiving and processing input from a number of other devices, including a keyboard, mouse, or electronic stylus (not shown in FIG. 1). Similarly, an input/output controller 24 may provide output to a display screen, a printer, or other type of output device.

As mentioned briefly above, a number of program modules and data files may be stored in the mass storage device 18 and RAM 8 of the computer 2, including an operating system 16 suitable for controlling the operation of a networked personal or server computer, such as the LINUX or FREE BSD operating systems. The mass storage device 18 and RAM 9 may also store a BIOS image file 28. The BIOS image file 28 comprises a data file that may be utilized by recovery program code located within the BIOS 14 to restore the contents of the BIOS 14 in the event that it becomes corrupted or outdated. The recovery program code is stored within a special hardware protected region of the EEPROM 10, called the boot block, that is not always reprogrammed and which may be deleted separately from the rest of the BIOS. In this manner, the recovery program code is always available to restore the contents of the remainder of the BIOS 14, even if portions of the remainder of the BIOS 14 are inadvertently erased. In order to reprogram the contents of the BIOS 14, the recovery program code may operate in conjunction with a BIOS update utility 29 executing on the operating system 16 to copy the contents of the BIOS image file 28 to the EEPROM 10. Additional details regarding the program code contained in the BIOS 14 for restoring the contents of the BIOS 14 will be described in greater detail below.

It should be appreciated that the system memory 6 of the computer 2 is organized into a physical address space for the computer 2. Through memory addresses made available through the physical address space, programs executing on the computer 2 can access memory locations within the system memory 6. Additionally, according to the various embodiments of the invention, the operating system 16 is operative to provide a virtual memory address space for addressing memory within the computer 2. As known to those skilled in the art, virtual memory refers to the process of "virtualizing" the available memory within a computer system by storing some of the data for the computer 2 on a backing store, such as the mass storage device 18. If a requested memory page is stored on the backing store and not available in physical memory, a "page fault" occurs. The page fault results in an operating system handler being executed to retrieve the requested page and store it in main memory. Other pages may be swapped out of main memory to make space for the retrieved page. The virtual memory address space is utilized by programs executing on the operating system 16, such as the BIOS update utility 29. Additional details regarding the operation of such a virtual memory system will be described in greater detail below with respect to FIG. 2.

Figure 2:
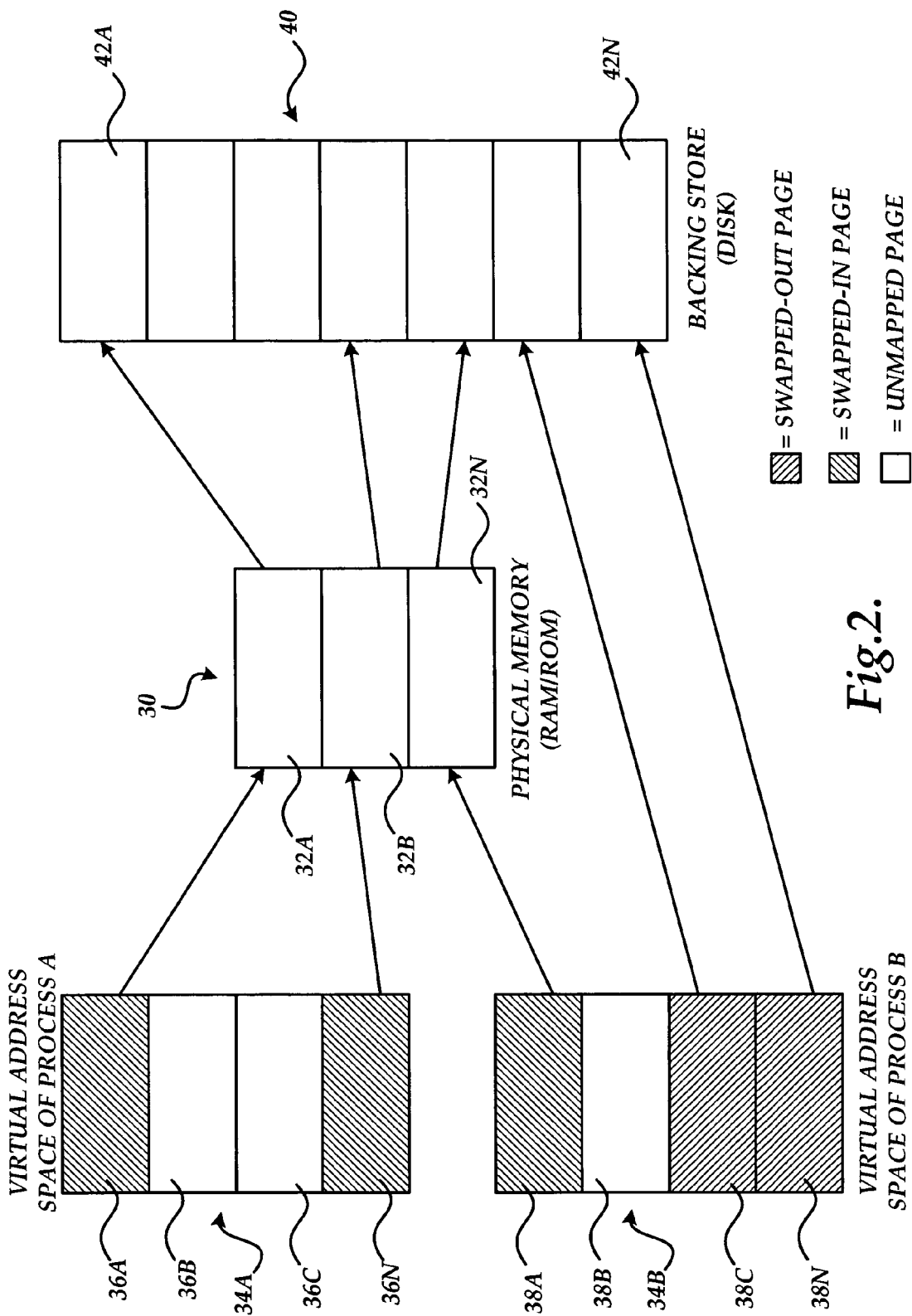
FIG. 2 is a block diagram illustrating aspects of a virtual memory system provided by a computer system utilized in the various embodiments of the invention.

Referring now to FIG. 2, additional details will be provided regarding the physical and virtual memory address spaces utilized by the computer 2. As shown in FIG. 2, the physical memory of the computer 2, including the RAM 8 and the EEPROM 10 is mapped to a physical memory address space 30. Memory locations within the physical memory address space 30 are divided into memory "pages" 32A–32N and can be addressed by certain types of computer programs executing on the computer 2. One type of program that can access the memory directly through the physical memory address space 30 are programs executing within the SMM mode provided by the computer 2. In particular, the BIOS recovery program code executing within the BIOS 14 executes within the SMM mode and can address locations within the physical memory address space 30 using physical memory addresses. The BIOS recovery program code cannot address memory using virtual memory addresses.

In a system supporting a virtual memory address space, such as that provided by the operating system 16, the program code deals with virtual addresses. Upon use, virtual addresses are translated by a memory management unit to obtain a physical address that is used to access physical memory. In this way, some operating systems can simulate having more memory than is available as physical memory by storing part of the data in a backing store, such as the mass storage device 18. As described briefly above, if a requested memory page is stored on the backing store and not available in physical memory, a page fault occurs. The page fault results in an operating system handler being executed to retrieve the requested page and store it in main memory. Other pages may be swapped out of main memory to make space for the retrieved page.

As shown in FIG. 2, each process executing in a virtual memory address system typically has its own separate virtual memory address space including its own mappings and protections. For instance, as illustrated in FIG. 2, the process 34A includes its own virtual address space including memory pages 36A–36N. The process 34B also has its own virtual memory address space including memory pages 38A–38N. As also shown in FIG. 2, pages within a virtual memory address space for a process may be stored on the backing store 40, such as the mass storage device 18, and swapped into or out of the physical memory as needed. For example, as shown in FIG. 2, the pages 36A and 36N are stored on the backing store 40, but are swapped into the physical memory at pages 32A and 32B. In a similar manner, the page 38A in the virtual memory address space 34B is swapped into the physical memory at page 32C. However, the pages 38C and 38N in the virtual memory address space 34B are swapped out to the backing store 40. If either of these pages are necessary, the memory management unit will be required to swap the appropriate page into the physical memory. Other pages, such as the pages 32A–32B, may need to be swapped out to make room for the needed pages. In this manner, the computer 2 can appear to an application program to have a larger memory space than that available through the physical memory address space 30.

Figure 3:
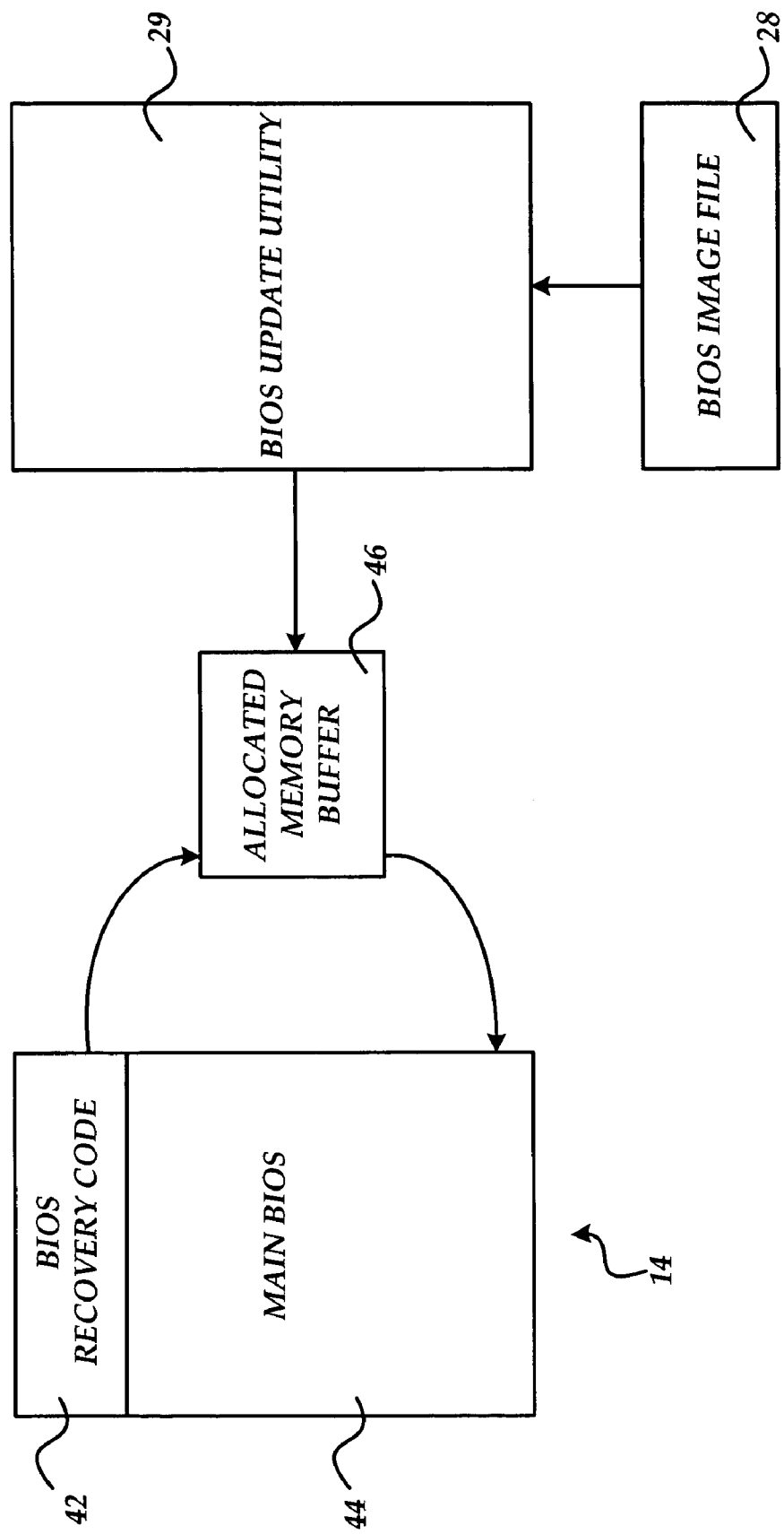
FIG. 3 is a block diagram illustrating the use of physical and virtual memory addresses to address a memory buffer according to various embodiments of the invention.

Referring now to FIG. 3, a block diagram illustrating the use of physical and virtual memory addresses to address a memory buffer according to various embodiments of the invention will be described. As discussed briefly above, the BIOS update utility 29 and the BIOS recover code 42 stored in the computer BIOS 14 may be utilized to update the contents of the BIOS 14. As discussed briefly above, the BIOS recovery code 42 is stored in a separate hardware protected region of the BIOS 14 that may be written to by the BIOS recovery code 42. The remainder of the BIOS 14, referred to herein as the "main BIOS" 44, is stored in another separated region that may be written to by the BIOS recovery code 42 also.

Figure 4:
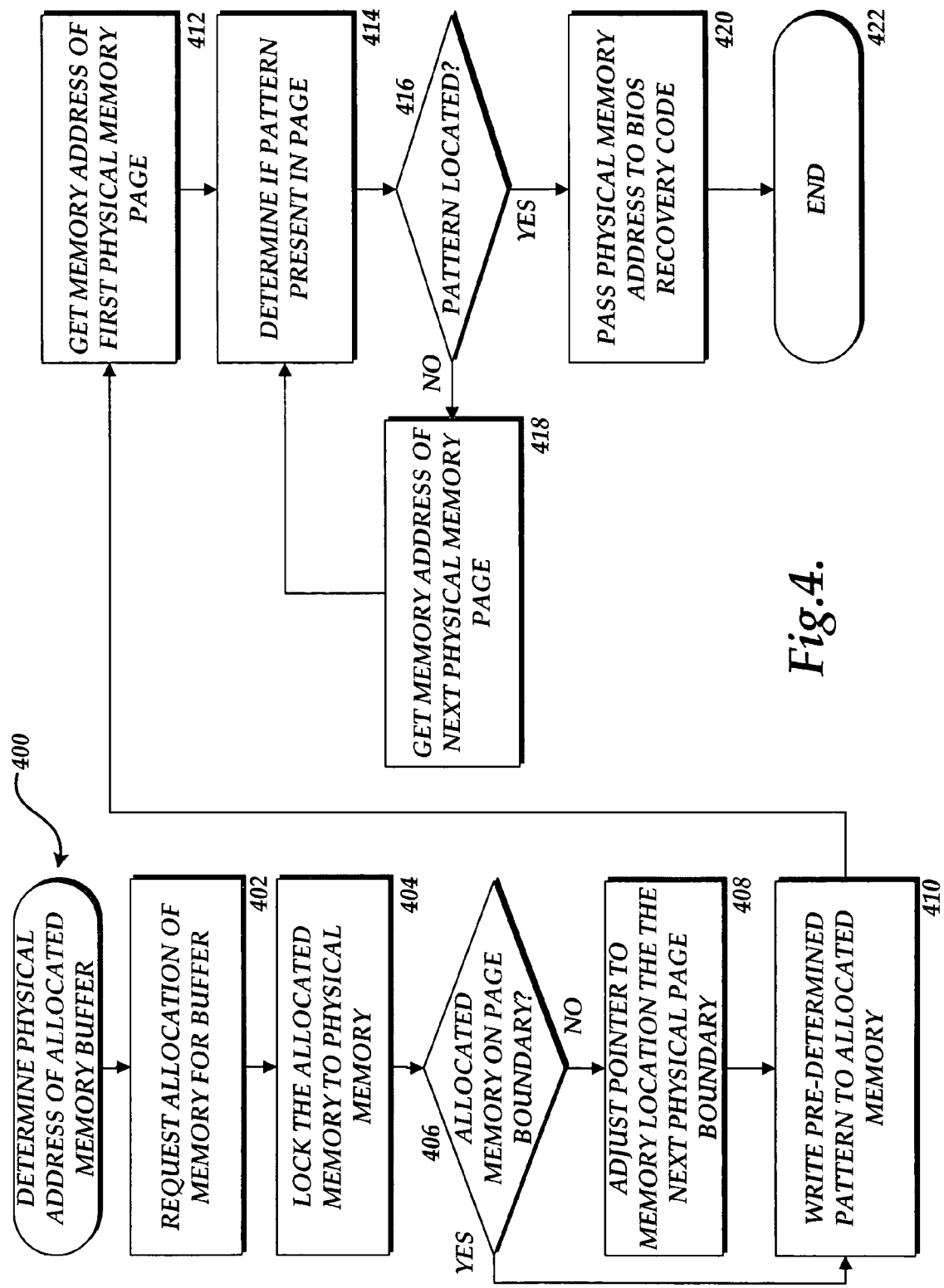
FIG. 4 is a flow diagram illustrating a method for determining the physical memory address of an allocated memory buffer according to one embodiment of the invention.

According to one embodiment of the invention, the BIOS update utility 29 is launched by a user of the computer 2 to begin the update process. As discussed above, the BIOS update utility application program 29 is executed on the operating system 16 and therefore utilizes virtual addresses. Once launched, the BIOS update utility 29 attempts to locate the BIOS image file 28. The BIOS image file 28 contains the new main BIOS image to replace the current contents of the main BIOS 44. The BIOS image file 28 may be stored on the mass storage device 18 or available from a location on the network 20. Because the BIOS recover code 42 includes the actual program code for updating the BIOS 14, the BIOS update utility must communicate with the BIOS recovery code 42. Moreover, the BIOS update utility must also transfer the BIOS image file 28 to the BIOS recovery code 42. In order to effect such communication, the allocated memory buffer 46 is utilized. The memory buffer 46 is shared between the BIOS update utility 29 and the BIOS recover code 42. However, because the BIOS recovery code 42 executes in SMM mode, it cannot access the allocated memory buffer 46 utilizing the virtual memory addresses used by the BIOS update utility. Rather, the BIOS recovery code 42 must utilize the address of the allocated memory buffer 46 within the physical memory address space. Accordingly, a method must be provided for determining the address of the allocated memory buffer 46 within the physical memory address space and passing this information to the BIOS recovery code 42. FIG. 4 illustrates such a method.

Turning now to FIG. 4, a flow diagram will be described illustrating a method for determining the physical memory address of an allocated memory buffer according to one embodiment of the invention. It should be appreciated that the logical operations of the various embodiments of the present invention, including those shown in FIG. 4, are implemented (1) as a sequence of computer implemented acts or program modules running on a computer system and or (2) as interconnected machine logic circuits or circuit modules within the computer system. The implementation is a matter of choice dependant upon the performance requirements of the computer system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

It should also be appreciated that the routine 400 illustrated in FIG. 4 is performed by the BIOS update utility 29 to facilitate communication with the BIOS recovery program code 42. However, it should be appreciated that the routine 400 may be utilized by any application program that utilized virtual memory addresses to enable communication with another program that does not have access to the virtual memory addresses.

The routine 400 begins at operation 402, where the BIOS update utility 29 requests the allocation of a memory buffer from the operating system 16. The memory may be allocated by the operating system 16 through a call to an application programming interface ("API") provided by the operating system 16. For instance, when used in conjunction with the LINUX operating system, a call may be made to the "malloc( )" or "calloc( )" routines. In this regard, the request for an allocated memory buffer must include a requested size of the buffer. To ensure that the returned memory buffer will not exceed a single physical memory page, the requested size for the memory buffer may be less than or equal to the size of a memory page within the physical memory address space. Alternatively, the allocation may be executed on the requested amount plus the size of one page of physical memory minus one in order to guarantee that the desired amount of memory is allocated within the same page of physical memory.

In response to the request for an allocated memory buffer, the operating system 16 returns a pointer to the memory buffer. The pointer is expressed as a virtual address within the virtual memory address space for the BIOS update utility process. Once the pointer has been received, the routine 400 continues to operation 404, where the allocated memory is locked to physical memory. When implemented in conjunction with the LINUX operating system, this may be accomplished through the use of the "mlock( )" system call.

After the allocated memory buffer has been locked to a location within the physical memory, the routine 400 continues to operation 406, where the BIOS update utility 29 determines whether the allocated memory buffer in the virtual memory address space is aligned with a page boundary in the physical memory address space. If the allocated memory buffer is aligned with a page boundary in the physical memory address space, the routine 400 branches from operation 406 to operation 410. However, if the pointer to the allocated memory buffer is not aligned on a page boundary in the physical memory address space, the routine 400 continues to operation 408.

At operation 408, the BIOS update utility 29 adjusts the pointer to the allocated memory buffer so that it aligns to a page boundary in the physical memory address space. Because pages in the virtual and physical memory address spaces share least significant bits, the alignment may be performed using a mask operation. From operation 408, the routine 400 continues to operation 410.

At operation 410, the BIOS update utility 29 writes a predetermined bit pattern to the allocated memory buffer. In particular, the bit pattern may be written at the location pointed to by the pointer to the allocated memory buffer. In this manner, the bit pattern may be written at a page boundary in the physical memory address space.

According to various embodiments of the invention, the predetermined bit pattern may be configured in a manner to avoid writing a bit pattern that randomly appears at a page boundary within the computer system 2. In particular, the bit pattern may include a number of bits that are predefined and a number of bits that are random. The random bits may be obtained by a call to the "/dev/random" device when implemented in conjunction with the LINUX operating system. The predefined bits and random bits may be placed in adjacent memory locations. According to one embodiment 64 bits may be used for the predefined bit pattern and 32 bits may be used for the random bit pattern, but any sufficient number of bits may be utilized.

From operation 410, the routine 400 continues to operation 412, where the memory address of the first physical memory page is obtained. Access to the physical memory page may be obtained by a call to the physical memory device driver ("/dev/mem" device when used in conjunction with the LINUX operating system). The routine 400 then continues to operation 414, where a search is made of the physical memory page to determine if the written bit pattern is contained therein. In order to speed the search routine, the search may be limited to data located at the page boundary, where the written bit pattern should be located.

If the predetermined bit pattern is not located in the current page of physical memory, the routine 400 branches to operation 418, where the address of the next page of physical memory is obtained. The routine 400 then returns to operation 414, where a determination is made as to whether the bit pattern exists in the current page. In this manner, a search may be made of each page of the physical memory address space until the written bit pattern has been located.

If, at operation 416, it is determined that the predetermined bit pattern has been located in a page of the physical memory, the routine 400 continues to operation 420. Because the location of the predetermined bit pattern was located in physical memory, the address of the allocated memory buffer in the physical address space of the computer 2 has been determined. Accordingly, at this stage, the BIOS update utility 29 has both the virtual address of the memory buffer and the physical address of the allocated memory buffer. Accordingly, to allow the BIOS recovery code 42 to access the contents of the allocated memory buffer, the BIOS update utility 29 passes the physical address of the allocated memory buffer to the BIOS recovery code 42 at operation 420.

Because the BIOS recovery code 42 has the physical address of the allocated memory buffer 46, it can retrieve data stored in the allocated memory buffer 46 by the BIOS update utility 29. In particular, the BIOS recovery code 42 can retrieve from the allocated memory buffer 46 the contents of the BIOS image file 28. In this manner, the BIOS image file 28 can be utilized by the BIOS recovery code 42 to update the BIOS 14. The BIOS update utility 29 can utilize the virtual address of the allocated memory buffer 46 to place the contents of the BIOS image file 28 in the memory buffer. Accordingly, from operation 420, the routine 400 continues to operation 422, where it ends.

Based on the foregoing, it should be appreciated that the various embodiments of the invention provide methods and systems for determining the memory address of an allocated memory buffer within the physical address space of a computing system. The above specification, examples and data provide a complete description of the manufacture and use of the composition of the invention. Since many embodiments of the invention can be made without departing from the spirit and scope of the invention, the invention resides in the claims hereinafter appended.

We claim:

1. In a computer system having a memory and capable of supporting a physical memory address space and a virtual memory address space, a method for determining the address of an allocated memory buffer within the physical address space, the method comprising:
   requesting the allocation of memory for the memory buffer;
   in response to the request, receiving a virtual memory address in the virtual memory address space for the memory buffer;
   determining whether the virtual memory address in the virtual memory address space corresponds to a page boundary in the physical memory address space;
   in response to determining that the virtual memory address does not correspond to a page boundary in the physical memory address space, adjusting the virtual memory address to correspond to a page boundary in the physical memory address space;
   locking the memory buffer to its location within the physical memory address space;
   writing a predetermined bit pattern to the memory area identified by the adjusted virtual memory address;
   searching the physical memory address space for the bit pattern;
   determining whether the bit pattern was located in the physical memory address space;
   in response to locating the bit pattern in the physical memory address space, determining the address in the physical memory address space at which the bit pattern was located; and
   utilizing both the identified address in the physical memory address space at which the bit pattern was located and the adjusted virtual memory address in the virtual memory address space for the memory buffer to reference the memory buffer.

2. The method of claim 1, wherein the size of the memory buffer is less than or equal to a page size for memory pages within the physical memory address space.

3. The method of claim 2, wherein requesting the allocation of memory for the memory buffer comprises requesting the allocation of memory for the memory buffer in a desired amount plus an amount equal to the page size for memory pages within the physical memory address space.

4. The method of claim 3, wherein adjusting the virtual memory address to correspond to a page boundary in the physical memory address space comprises adjusting the virtual memory address to correspond to a page boundary in the physical memory address space and within the memory area allocated for the memory buffer.

5. The method of claim 4, wherein writing a predetermined bit pattern to the memory area identified by the adjusted virtual memory address comprises writing the predetermined bit pattern beginning at the virtual memory address.

6. The method of claim 5, wherein searching the physical memory address space for the bit pattern comprises searching at each page boundary in the physical memory address space for the bit pattern.

7. The method of claim 6, wherein the bit pattern comprises at least a predefined portion and a random portion.

8. The method of claim 7, wherein the predefined portion and the random portion are adjacent.

9. A computer storage medium having computer-executable instructions stored thereon which, when executed by a computer, cause the computer to:
  request the allocation of memory for a memory buffer;
  in response to the request, to receive a virtual memory address in a virtual memory address space for the memory buffer;
  determine whether the virtual memory address in the virtual memory address space corresponds to a page boundary in a physical memory address space;
  in response to determining that the virtual memory address does not correspond to a page boundary in the physical memory address space, to adjust the virtual memory address to correspond to a page boundary in the physical memory address space;
  lock the memory buffer to its location within the physical memory address space;
  write a predetermined bit pattern to the memory area identified by the adjusted virtual memory address;
  search the physical memory address space for the bit pattern;
  determine whether the bit pattern was located in the physical memory address space;
  in response to locating the bit pattern in the physical memory address space, determine the address in the physical memory address space at which the bit pattern was located; and to
  utilize both the identified address in the physical memory address space at which the bit pattern was located and the adjusted virtual memory address in the virtual memory address space for the memory buffer to reference the memory buffer.

10. The computer storage medium of claim 9, wherein the size of the memory buffer is less than or equal to a page size for memory pages within the physical memory address space.

11. The computer storage medium of claim 10, wherein requesting the allocation of memory for the memory buffer comprises requesting the allocation of memory for the memory buffer in a desired amount plus an amount equal to the page size for memory pages within the physical memory address space.

12. The computer storage medium of claim 11, wherein adjusting the virtual memory address to correspond to a page boundary in the physical memory address space comprises adjusting the virtual memory address to correspond to a page boundary in the physical memory address space and within the memory area allocated for the memory buffer.

13. The computer storage medium of claim 12, wherein writing a predetermined bit pattern to the memory area identified by the adjusted virtual memory address comprises writing the predetermined bit pattern beginning at the virtual memory address.

14. The computer storage medium of claim 13, wherein searching the physical memory address space for the bit pattern comprises searching at each page boundary in the physical memory address space for the bit pattern.

15. The computer storage medium of claim 14, wherein the bit pattern comprises at least a predefined portion and a random portion.

16. The computer storage medium of claim 15, wherein the predefined portion and the random portion are adjacent.

17. An apparatus for determining the address of an allocated memory buffer within the physical address space, the apparatus comprising:
  a central processing unit capable of supporting a physical memory address space and a virtual memory address space; and
  a memory storing a computer program, the computer program operative to:
   request the allocation of memory for a memory buffer;
   in response to the request, to receive a virtual memory address in the virtual memory address space for the memory buffer;
   determine whether the virtual memory address in the virtual memory address space corresponds to a page boundary in the physical memory address space;
   in response to determining that the virtual memory address does not correspond to a page boundary in the physical memory address space, to adjust the virtual memory address to correspond to a page boundary in the physical memory address space;
   lock the memory buffer to its location within the physical memory address space;
   write a predetermined bit pattern to the memory area identified by the adjusted virtual memory address;
   search the physical memory address space for the bit pattern;
   determine whether the bit pattern was located in the physical memory address space;
   in response to locating the bit pattern in the physical memory address space, determine the address in the physical memory address space at which the bit pattern was located; and to
   utilize both the identified address in the physical memory address space at which the bit pattern was located and the adjusted virtual memory address in the virtual memory address space for the memory buffer to reference the memory buffer.

18. The apparatus of claim 17, wherein the size of the memory buffer is less than or equal to a page size for memory pages within the physical memory address space.

19. The apparatus of claim 18, wherein requesting the allocation of memory for the memory buffer comprises requesting the allocation of memory for the memory buffer in a desired amount plus an amount equal to the page size for memory pages within the physical memory address space.

20. The apparatus of claim 19, wherein adjusting the virtual memory address to correspond to a page boundary in the physical memory address space comprises adjusting the virtual memory address to correspond to a page boundary in the physical memory address space and within the memory area allocated for the memory buffer.

* * * * *